(12) United States Patent
Allen et al.

(10) Patent No.: US 10,928,193 B2
(45) Date of Patent: Feb. 23, 2021

(54) THREE-DIMENSIONAL CALIBRATION TOOLS AND METHODS

(71) Applicants: ILLINOIS TOOL WORKS INC., Glenview, IL (US); Roy Allen, North Andover, MA (US); Stephen M. McMahon, Quincy, MA (US)

(72) Inventors: Roy Allen, North Andover, MA (US); Stephen M. McMahon, Quincy, MA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/099,247

(22) PCT Filed: May 11, 2017

(86) PCT No.: PCT/US2017/032100
§ 371 (c)(1),
(2) Date: Nov. 6, 2018

(87) PCT Pub. No.: WO2017/205061
PCT Pub. Date: Nov. 30, 2017

(65) Prior Publication Data
US 2019/0212139 A1      Jul. 11, 2019

Related U.S. Application Data

(60) Provisional application No. 62/340,766, filed on May 24, 2016.

(51) Int. Cl.
*G01B 21/04* (2006.01)
*G06T 7/80* (2017.01)
(Continued)

(52) U.S. Cl.
CPC ............. *G01B 21/042* (2013.01); *G01B 3/30* (2013.01); *G01B 11/16* (2013.01); *G06T 7/85* (2017.01);
(Continued)

(58) Field of Classification Search
CPC .... H04N 13/239; H04N 13/246; G01B 11/16; G01B 21/042; G01B 3/30;
(Continued)

(56) References Cited

U.S. PATENT DOCUMENTS 5,173,679 A    12/1992  Mount
7,995,098 B2 *  8/2011  Pedeville ............... H04N 17/04
                                              348/190
(Continued)

FOREIGN PATENT DOCUMENTS

CN      102519710       6/2012
CN      103048872       4/2013
(Continued)

OTHER PUBLICATIONS

International Search Report issued in PCT/US2017/032100 dated Jul. 6, 2017.
(Continued)

*Primary Examiner* — Deoram Persaud
(74) *Attorney, Agent, or Firm* — McCarter & English LLP

(57) ABSTRACT

This disclosure relates to methods and tools for calibrating a camera-based three-dimensional optical metrology system such as that used for non-contact measurement of strain in a materials test system. A tool is provided which holds a calibration plate within a test space of a load frame of a materials testing device. The tool includes a spindle which rotates around a rotational axis to a series of detent rotational positions. The spindle engages the calibration plate by a
(Continued)

bearing configuration which allows the tilt angle of the calibration plate to be varied. The rotation of the spindle and the variation of the tilt angle provides for two degrees of freedom of movement within the test space. The resulting sequence of calibration plate positions is systematic and repeatable.

16 Claims, 7 Drawing Sheets

(51) Int. Cl.
*H04N 13/246* (2018.01)
*H04N 13/239* (2018.01)
*G01B 3/30* (2006.01)
*G01B 11/16* (2006.01)

(52) U.S. Cl.
CPC ......... *H04N 13/239* (2018.05); *H04N 13/246* (2018.05); *G06T 2207/10012* (2013.01); *G06T 2207/30164* (2013.01); *G06T 2207/30208* (2013.01)

(58) Field of Classification Search
CPC . G06T 2207/10012; G06T 2207/30164; G06T 2207/30208; G06T 7/85
See application file for complete search history.

(56) References Cited

U.S. PATENT DOCUMENTS

| | | | |
|---|---|---|---|
| 8,619,144 B1 | 12/2013 | Chang et al. | |
| 8,662,676 B1* | 3/2014 | Chang | H04N 9/3185 353/69 |
| 10,445,898 B2* | 10/2019 | Liu | G06T 7/80 |
| 10,453,218 B2* | 10/2019 | Doganis | H04N 17/002 |
| 10,502,552 B2* | 12/2019 | Hoehl | G06T 7/0004 |
| 10,510,162 B2* | 12/2019 | Doganis | G06T 7/13 |
| 10,552,984 B2* | 2/2020 | Virodov | G06T 7/74 |
| 2003/0190116 A1* | 10/2003 | Freeman | G02B 6/3518 385/18 |
| 2009/0249606 A1* | 10/2009 | Diez | B23K 37/0461 29/428 |
| 2011/0026014 A1* | 2/2011 | MacK | G03B 13/22 356/124 |
| 2012/0105591 A1 | 5/2012 | Kim et al. | |
| 2012/0176629 A1* | 7/2012 | Allen | G01D 5/38 356/616 |
| 2012/0242839 A1* | 9/2012 | Shen | H04N 17/002 348/187 |
| 2012/0287248 A1* | 11/2012 | Erdman, III | G01N 3/068 348/47 |
| 2013/0063570 A1* | 3/2013 | Michopoulos | G01B 11/165 348/47 |
| 2013/0070048 A1* | 3/2013 | Huang | G01B 11/16 348/36 |
| 2013/0083168 A1* | 4/2013 | Kim | H04N 13/239 348/47 |
| 2015/0273381 A1 | 10/2015 | Stoner, Jr. et al. | |
| 2017/0221210 A1* | 8/2017 | Martinello | H04N 13/282 |
| 2017/0228864 A1* | 8/2017 | Liu | G06T 7/80 |
| 2019/0154554 A1* | 5/2019 | Iwakiri | G01N 29/4427 |

FOREIGN PATENT DOCUMENTS

| | | |
|---|---|---|
| CN | 203185190 | 9/2013 |
| CN | 203426903 | 2/2014 |
| CN | 104792297 | 7/2015 |
| CN | 204887156 | 12/2015 |
| JP | 1973109340 | 12/1973 |
| JP | 2003172713 | 6/2003 |
| JP | 2009145278 | 7/2009 |
| JP | 2013169628 | 9/2013 |
| KR | 20150094928 | 8/2015 |
| WO | 2012135014 | 10/2012 |
| WO | 2016179798 | 11/2016 |

OTHER PUBLICATIONS

Japanese Office Action issued in 2018-561650 dated Dec. 22, 2020.

* cited by examiner

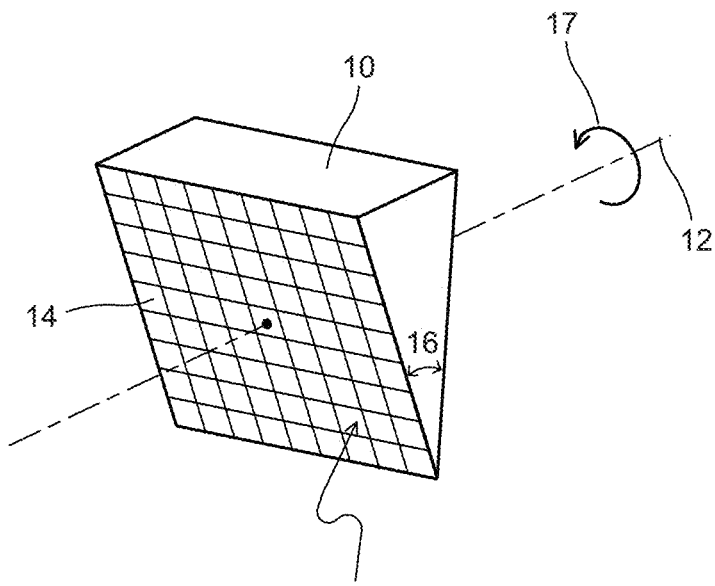
Rotating Wedge:
Tilted face has high
contrast checkerboard
or dot array pattern
F I G. 2.
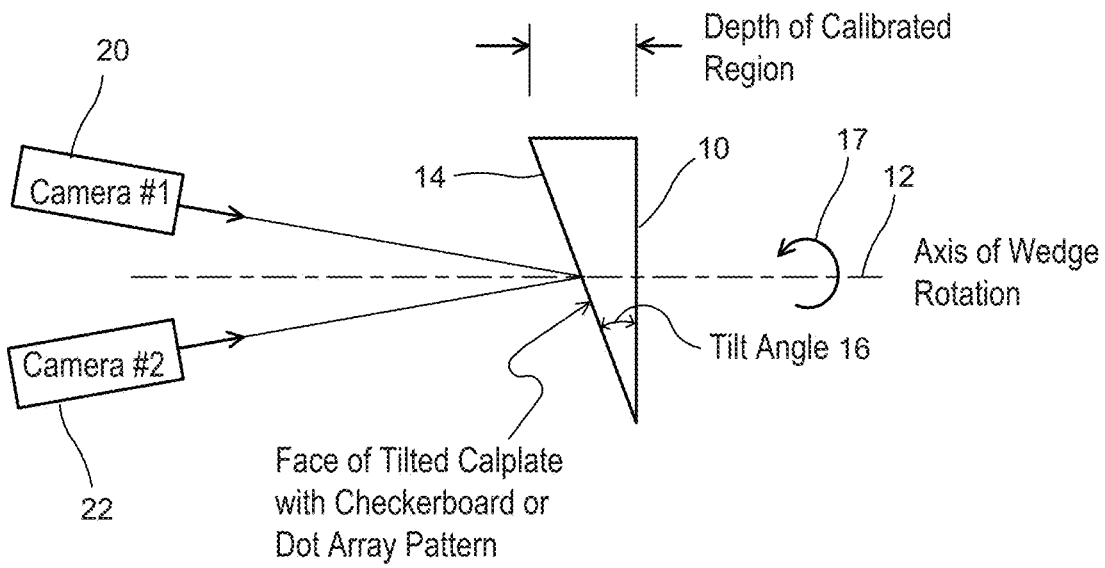
F I G. 3

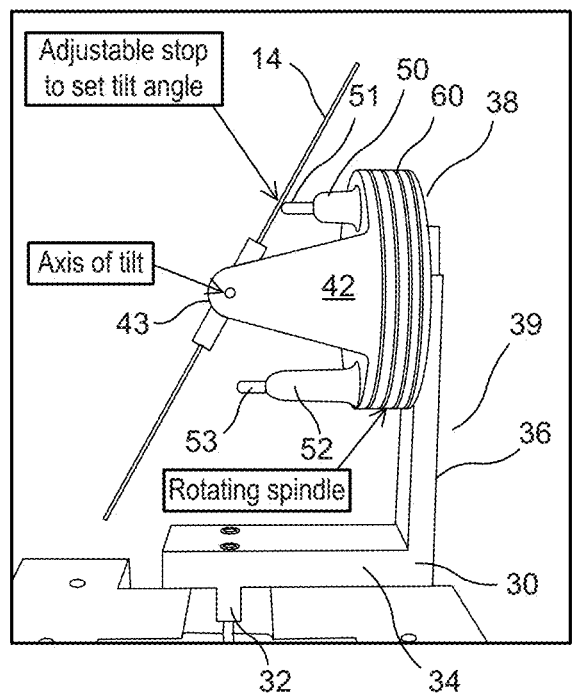
F I G. 7
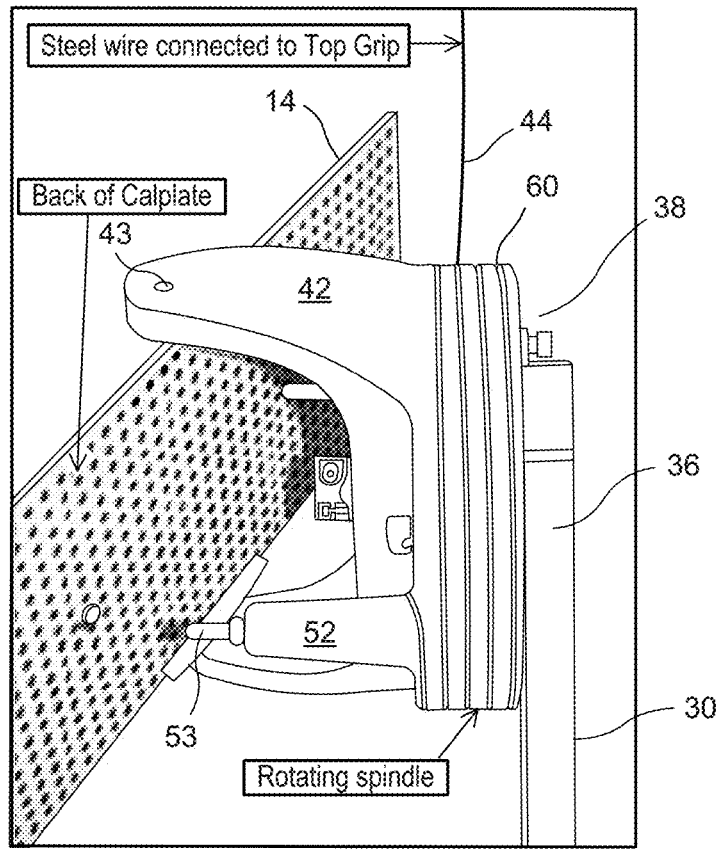
F I G. 8

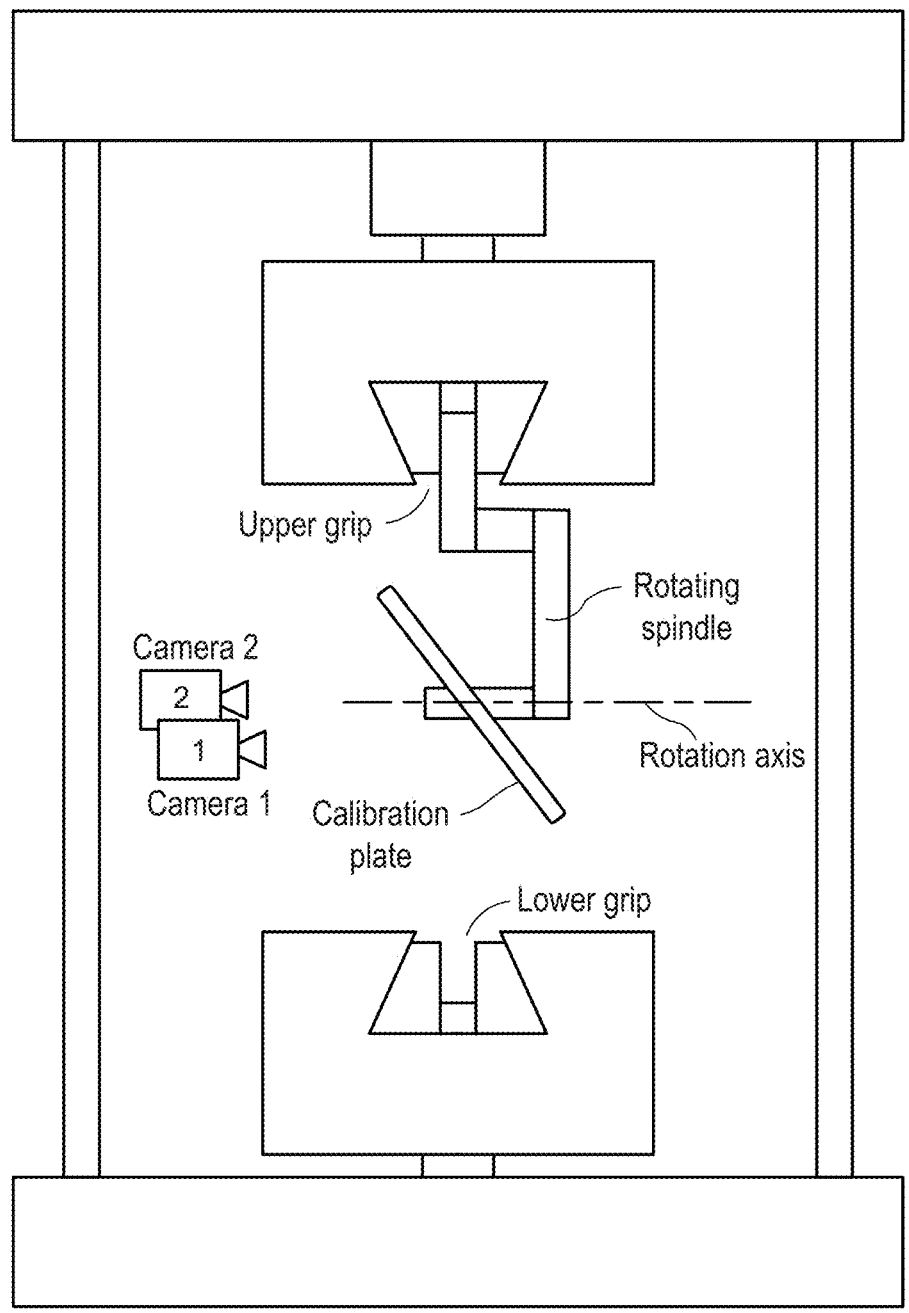
F I G. 9

THREE-DIMENSIONAL CALIBRATION TOOLS AND METHODS

This application is a National Phase application of PCT/US2017/032100 filed May 11, 2017 which claims priority under 35 U.S.C. § 119(e) of U.S. provisional application Ser. No. 62/340,766 filed on May 24, 2016, the contents of which is hereby incorporated by reference in its entirety and for all purposes.

BACKGROUND OF THE DISCLOSURE

Field of the Disclosure

This disclosure relates to methods and tools for calibrating a camera-based three-dimensional optical metrology system such as that used for non-contact measurement of strain in a materials test system.

Description of the Prior Art

A three-dimensional optical metrology system, in order to perform non-contact measurement of strain of a sample during materials testing, typically combines multiple camera images from different perspective views of the same object in order to obtain the depth information necessary to provide a single three-dimensional view of the object. Each camera viewpoint has to be precisely calibrated in three dimensions in order to produce accurate three-dimensional measurements of the object under test. For each viewpoint, or camera, the calibration must perform the following actions:

1. Locate the pointing vector of the camera viewpoint in three-dimensional space. This establishes the position of the camera and its direction of view.
2. Define the orientation of the two-dimensional image sensor within the camera relative to its direction of view (pointing vector). This establishes any tilts or rotations of the image sensor.
3. Calibrate the distortions of the two-dimensional camera image produced by its optical system including lens distortion, alignment of lens relative to image sensor and any non-uniformity effects of the image sensor.
4. Calibrate changes to the two-dimensional camera image produced by object position changes in depth axis.

When each camera is thus calibrated, the combined calibration data sets define a common three-dimensional measurement volume in object space. The metrology system can then make calibrated three-dimensional measurements anywhere within this common volume.

This calibration process is typically accomplished by taking a series of pictures from each camera of a flat calibration plate that is held at multiple locations and orientations within the object space. The flat calibration plate provides an array of marks such as, for example, dots with known pre-calibrated diameter and spacing. The process is as follows:

1. An image of the calibration plate from each camera viewpoint is taken as the plate is held stationary at a given position in the three-dimensional measurement volume.
2. The calibration plate is then moved to new three-dimensional position within the measurement volume and an additional set of images is taken, one from each camera. The new location may typically include tilting and/or rotating the plate as well as translating it in the depth axis.
3. This process is repeated, progressively moving the calibration plate through the intended measurement volume. The calibration plate may alternatively be moved to random locations and orientations within the volume, being careful to sample the whole volume with the calibration plate.
4. The process ends when sufficient sampling of the volume is made—typically requiring 6 to 12 different calibration plate positions within the volume.

Any apparatus used for calibration must be easy to insert and remove from the measurement volume. It must be removed after calibration is complete to enable the user make three-dimensional measurements of an arbitrary specimen in the same volume. Therefore, it is a challenge to have a motorized means of moving the calibration plate that is simple, compact and self-contained. For this reason, the typical method of providing the necessary position changes of the calibration plate is for the operator to hold the plate by hand and move it about manually while the cameras take snapshots at intervals thereby capturing the plate at many unique locations and orientations within the target volume.

Generally, the exact locations/orientations of the calibration plate in the measurement volume do not have to be known. Instead, the calibration method relies on the known geometry of the features on the calibration plate to provide the necessary information for calibrating the array of images from each camera.

Prior art methods typically use a hand-held calibration plate 200 that is moved about the target calibration volume randomly as shown in FIG. 1. This produces a random set of locations/orientations, due to the uncertainties of the manual operation, and leaves the burden for establishing sufficient sampling of the three-dimensional volume directly on the operator. This results in, firstly, a need for higher operator training and, secondly, a three-dimensional calibration map produced by different location sampling with every calibration run. Both of these issues affect the repeatability and ease of use of the metrology system.

The following references provide examples of mathematical algorithms commonly used to produce a three-dimensional calibration map from similar sets of calibration plate images as described in this disclosure.

1. Z. Zhang, "A flexible new technique for camera calibration," IEEE Trans. Pattern Anal. Mach. Intell. 22(11), 1330-1334 (2000).
2. R. Tsai, "A versatile camera calibration technique for high accuracy three-dimensional machine vision metrology using off-the-shelf tv cameras and lenses," IEEE J. Robot. Autom. 3(4), 323-344 (1987).

OBJECTS AND SUMMARY OF THE DISCLOSURE

It is the object of this disclosure to provide a method of calibrating a three-dimensional optical metrology system that eliminates need for manual movements of a calibration plate and provides more repeatable and systematic calibration results. This provides greater ease of use, reduces level of operator training for calibration and reduces operator variability as a factor in final results.

This and other objects are attained by providing a mechanical device, which is typically engaged or clamped by a grip within a materials testing device, which supports a spindle with periodic detent rotational positions. The spindle further includes supports upon which a planar visual target (such as a calibration plate) pivots to desired angular positions. The rotation of the spindle provides for rotation about an axis to pre-determined detent positions, thereby providing a first degree of freedom of movement in the positioning of the visual target while the pivoting of the visual target provides a second degree of freedom of movement. Typically, two cameras are used to capture images of the visual target throughout a range of positions of the visual target thereby defining a common three-dimensional measurement volume in object space for subsequent non-contact measurement of strain of a sample in materials testing.

BRIEF DESCRIPTION OF THE DRAWINGS

Further objects and advantages of the disclosure will become apparent from the following description and from the accompanying drawings, wherein:

FIG. 2 is a perspective view, illustrating the rotating wedge, pursuant to an embodiment of the present disclosure.

FIG. 3 is a schematic illustrating an example of wedge rotation axis relative to two camera providing stereo three-dimensional measurements, pursuant to an embodiment of the present disclosure.

FIG. 7 is a perspective view of calibration plate tilt established by an adjustable magnetic stop, pursuant to an embodiment of the present disclosure.

FIG. 8 is a perspective view of spindle detail showing the connecting wire to the top grip, pursuant to an embodiment of the present disclosure.

FIG. 9 is a plan view of the installed apparatus of an embodiment of the present disclosure, with the calibration tool engaged or clamped by the top grip of a load frame.

DETAILED DESCRIPTION OF THE PREFERRED EMBODIMENT

Figure 1:
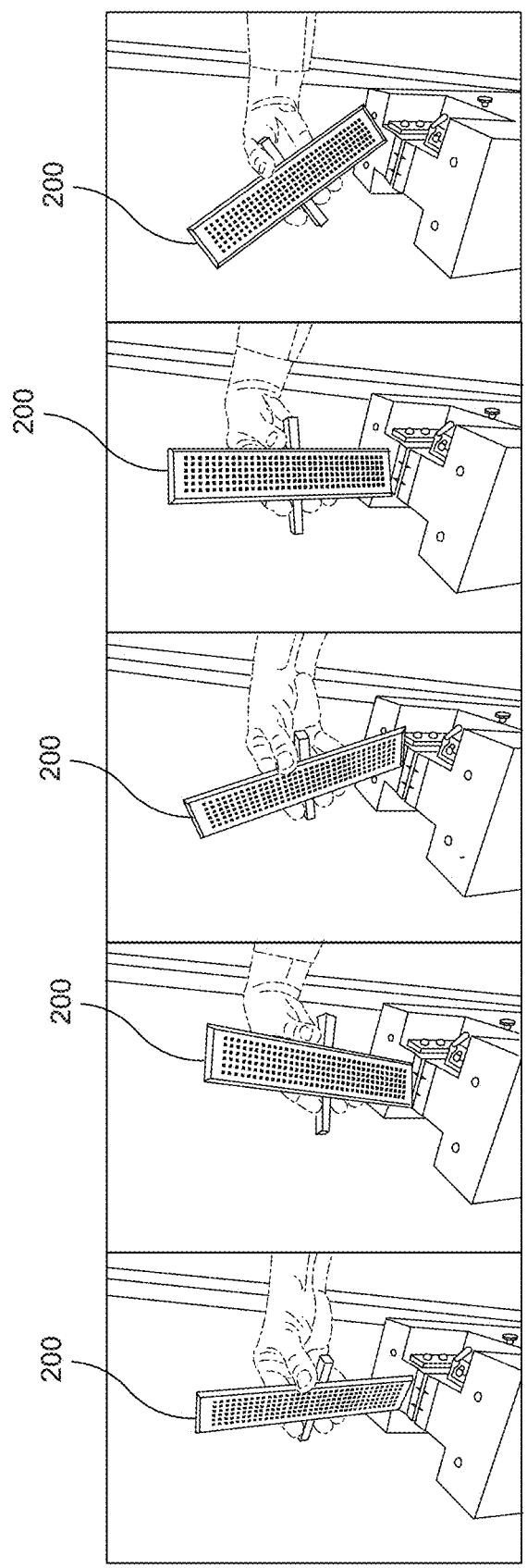
FIG. 1 is a series of drawings illustrating the prior art.

Referring now to the drawings in detail, wherein like numerals indicate like elements throughout the several views, one sees the disclosed embodiment of present method and apparatus. As shown in FIG. 2, the method and apparatus of the disclosed embodiment uses a wedge 10 which is rotated about its central axis 12 to create the necessary range of calibration plate motions. The wedge 10 is represented by a tilted calibration plane 14 having calibrated features such as a high-contrast checkerboard or dot-array pattern. The plane with features is referred to here as a calibration plate 14.

The wedge 10 that rotates about a fixed rotational axis 12, as shown in FIGS. 2 and 3, provides a repeatable and systematic set of orientations to calibration plate 14 to the first and second cameras or image sensors or image capture devices 20, 22 (see FIG. 3) for every calibration run. For example, the wedge 10 may be rotated in eight 45 degree increments about a full revolution through rotational angle 17, each increment held in place by a precise mechanical or electromechanical detent so that simple manual rotation between detents can provide repeatable view of the calibration plate 14 to the first and second cameras 20, 22. The tilt angle of the calibration plate 14 is precisely maintained and can be known to a high degree of accuracy by calibrating the wedge calibration tool 30 (see FIG. 4). To provide additional stable views, the wedge calibration tool 30 could be designed to allow selection of several different fixed tilt angles 16. For example, the wedge calibration tool 30 of FIG. 4 could provide mechanical tilt detents for both 30 degrees and zero degrees tilt of calibration plate 14. In this example, the operator can move the calibration plate 14 in a repeatable and systematic manner through four steps of 45 degrees rotation of rotational angle 17 at both zero degrees and 30 degrees of tilt angle 16. It is noted that the wedge 10 is used to illustrate the tilt angle 16 of the calibration plate 14 and that this tilt angle 16 may be implemented by other structures than a physical wedge 10.

Typically, the key element is that both the rotational angle 17 about axis 14 and tilt angle 16 can be kept to calibrated values, independent of operator manual input to affect rotational angle 17 or tilt angle 16, thereby providing repeatability and predictability to the process and method. All camera views of the calibration plate 14 can optimally fill the camera field of view without risk of skewing the calibration plate 14 to one side of the camera image by uncontrolled manual movements of the calibration plate 14.

FIG. 3 illustrates a typical setup of the rotating wedge 10. As illustrated, first and second cameras 20, 22 comprise a stereo vision system capable of providing three-dimensional measurements of an object in the test space. The rotating wedge 10 is placed in this test space for calibration of the system. Generally, the placement of the axis of rotation 12 is arbitrary. However, in the illustrated example, the axis of rotation 12 is oriented roughly on the mean viewing axis of the first and second cameras 20, 22 so that each camera 20, 22 sees approximately the same range of tilts and rotations of calibration plate 14.

Figure 4:
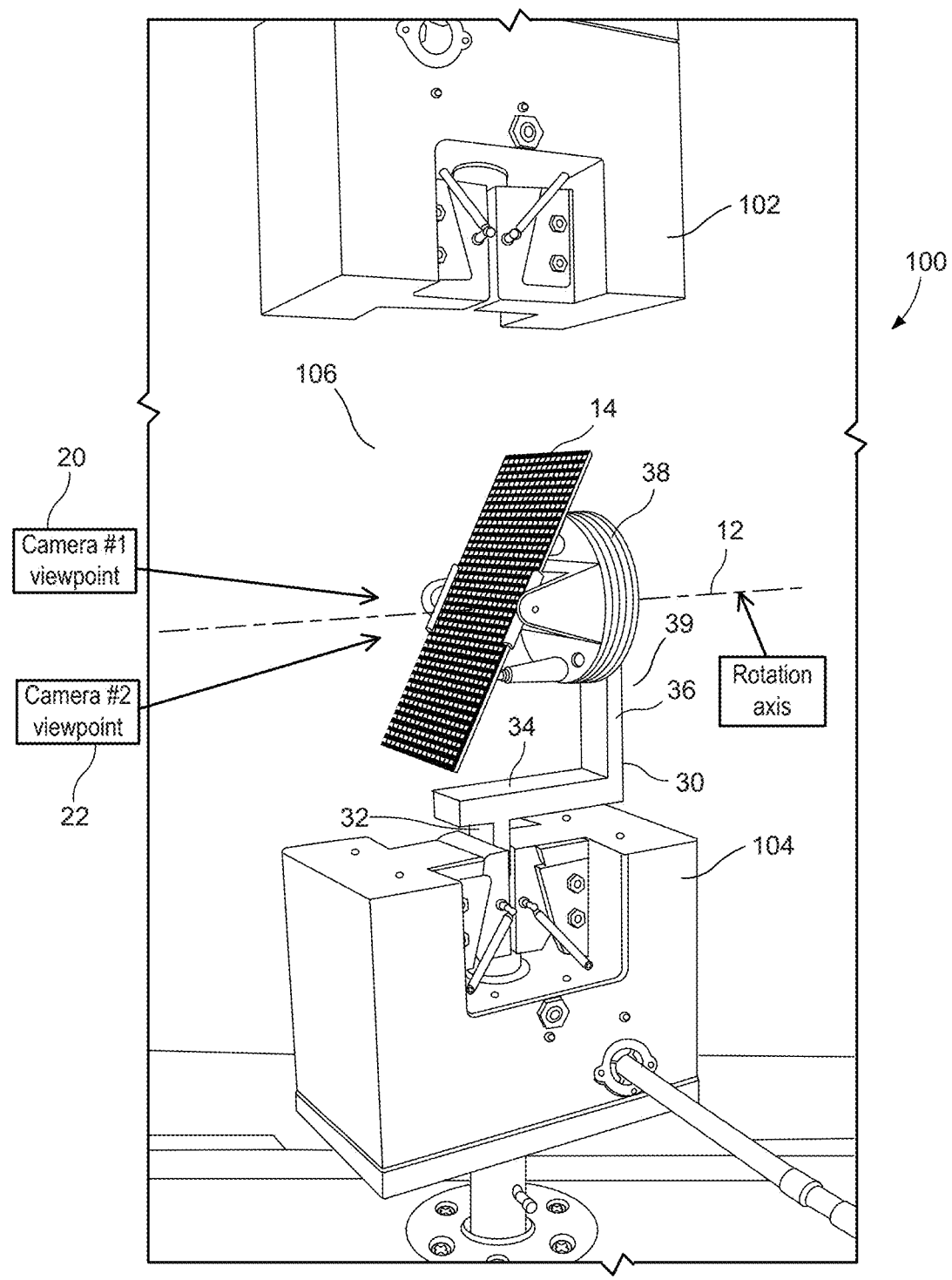
FIG. 4 is a perspective view of a calibration tool installed on a tensile test load frame, pursuant to an embodiment of the present disclosure.

As shown in FIG. 4, a rotating wedge calibration tool 30 is provided for application in a tensile test load frame 100. The requirement is to calibrate a three-dimensional metrology system designed as an integral component of a load frame 100. The video camera-based three-dimensional measurement system utilizes stereo views of the specimen under test (not shown) to produce a three-dimensional video strain map of the specimen as it undergoes tensile stress in the test space 106 between the upper and lower grips 102, 104 of load frame 100.

It is further typically important the calibration tool 30 be quickly and easily installed, be completely self-contained, require no critical alignments and be simple for the operator to use. As shown in FIGS. 4-8, the wedge calibration tool 30 is mounted in the specimen measurement test space 106 between the upper and lower grips 102, 104 of the load frame 100. The wedge calibration tool 30 includes a vertical mounting tab 32 so it can be rigidly held in place simply by closing or clamping the lower grip 104 onto the lower mounting tab 32 (or alternately, as shown in FIG. 9, the upper grip 102). The first and second cameras 20, 22, the viewpoints of each are illustrated in FIG. 4, each look at the calibration plate 14 from a different perspective, in this case the angle separating the lines of vision of first and second cameras 20, 22 is typically about 20 degrees. The rotation axis of the rotating calibration plate 14 roughly splits this separation angle in half.

The vertical mounting tab 32 is attached to a lower horizontal support member 34, which, in turn, is attached to a vertical spindle support member 36, thereby providing a frame 39 (typically made of injected plastic or metal) for the rotatable mounting of spindle 38. The spindle 38 is journaled for rotation and rotatably mounted on the upper end of the vertical spindle support member 36. The rotatable mounting of the spindle 38 on vertical support member 36 includes a detent function so that the spindle 38 rotatably moves to repeatable discrete rotational positions (thereby implementing the changes in rotational angle 17 about axis 12 in FIGS. 2 and 3), typically spaced apart by increments of 45 degrees, or some other integer division of 360 degrees. The spindle 38 further includes first and second support mounts 40, 42 extending from its periphery in the longitudinal direction (roughly parallel to axis of rotation 12), and including respective first and second rotational bearings 41, 43 to provide a swiveling mount for swiveling or pivoting the tilt angle (see element 16 in FIGS. 2 and 3) calibration plate 14 along a pivot axis formed between first and second rotational bearings 41, 43 without the necessity of using a physical wedge 10 as illustrated in FIGS. 2 and 3. Further, as best shown in FIG. 7, first and second magnetic stops 50, 52 extend from the periphery of the spindle 38 in roughly the longitudinal direction to fix the tilt angle of the calibration plate 14. The pivot axis provided by first and second rotational bearings 41, 43 is perpendicular to the rotational axis of spindle 34 thereby providing two orthogonal degrees of freedom of movement of the calibration plate 14.

Figure 5:
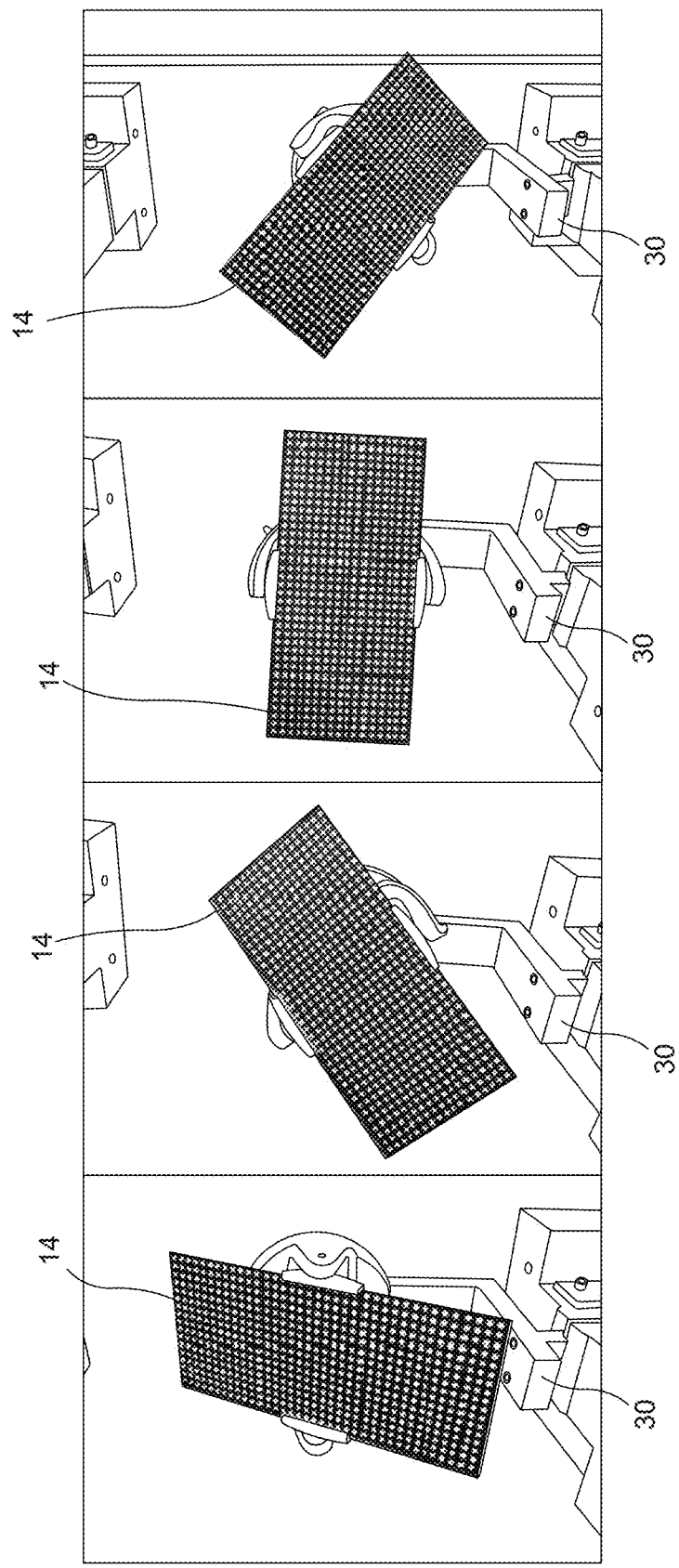
FIG. 5 is a series of views showing a camera view of a tilted calibration plate rotated in 45 degree increments, each position held by a mechanical detent, pursuant to an embodiment of the present disclosure.

A view of the rotating wedge calibration tool 30 from roughly the viewpoint of one of the first and second cameras 20, 22 is shown in FIG. 5. For illustration purposes, the image field of view shown is much larger than the actual field-of-view of the metrology system camera. In practice, the image of the calibration plate 14 would mostly fill the actual field-of-view of the metrology camera, thereby providing calibration data across most of the camera field-of-view. The spindle 38 holding the tilted calibration plate 14 shown is rotated in 45 degree increments about the rotational axis of the spindle 38 (see axis 12 of FIGS. 2 and 3), each position held by a mechanical detent so the operator can repeatably find the same rotational position on each calibration run.

In this embodiment, the spindle 38 may be rotated manually about its axis by the user. However, as shown in FIG. 8, the calibration tool 30 also provides a convenient means of automatic rotation by connecting a wire 44, wrapped around the outer circumferential surface 46 of the spindle 38, to the upper grip 102 and making use of linear crosshead motion of the load frame 100 to slowly rotate the spindle 38. In this configuration, the spindle 38 can be automatically rotated without requiring any form of electromechanical in the calibration tool 30 itself, thereby saving tool cost, physical size and complexity.

Figure 6:
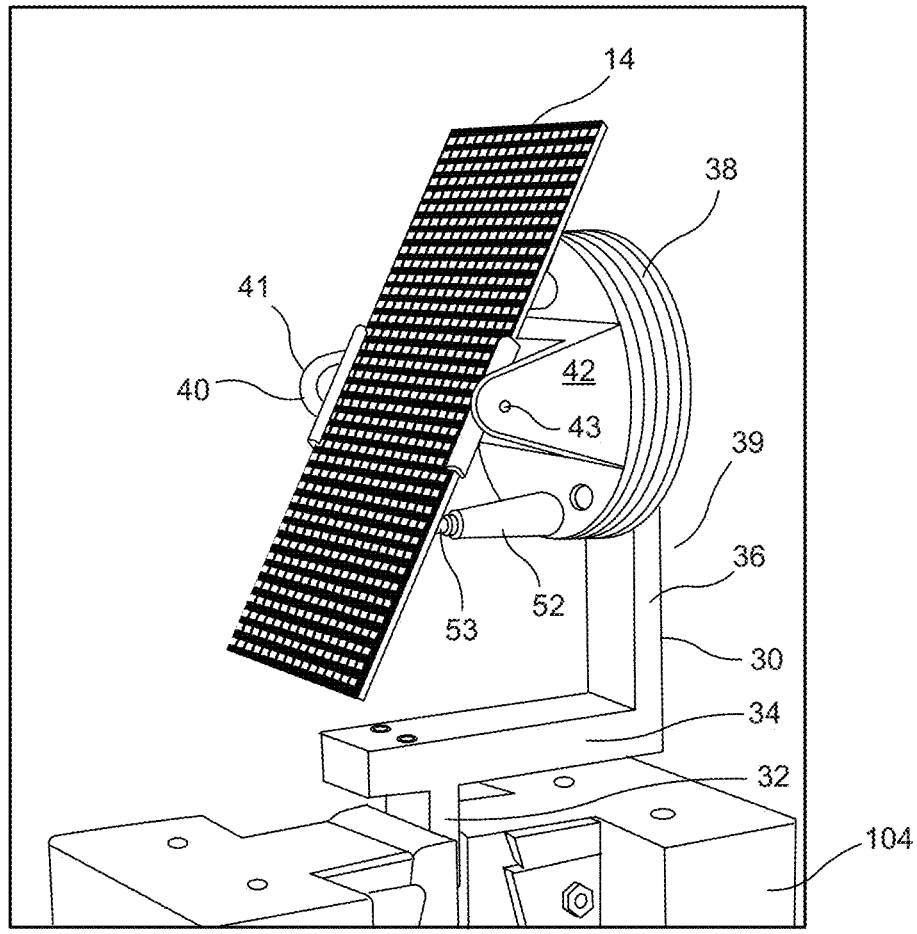
FIG. 6 is a perspective view of a calibration tool engaged or clamped by the lower grip of a load frame, pursuant to an embodiment of the present disclosure.

FIG. 6 shows a close-up view of the calibration tool 30 clamped in the lower grip 104. The tilted calibration plate 14 comprises of a thin metal plate with an array of white dots on a black background. The calibration plate 14 is tilted on the axis that bisects the center of the plate 14. The calibration plate 14 is mounted to the spindle 38 using a small rigid frame that holds the calibration plate 14 by its edges and includes the first and second rotational bearings 41, 43 that define the axis of tilt.

FIG. 7 shows more detail of the rotating calibration tool 30. The tilt of the calibration plate 30 is held to a fixed position (tilt angle 16 of FIGS. 2 and 3) by first or second magnetic stop 50, 52. First and second threaded stop pins 51, 53 within respective first and second magnetic stop 50, 52 within allow the tilt angle to be precisely locked to a known value. The calibration plate 14 is held to the top of first or second stop pin 51, 53 by a small magnet (not shown) on the calibration plate 14. First and second threaded stop pins 51, 53 are illustrated, each providing a precise tilt angle setting—stop pin 51 at 30 degrees tilt and stop pin 53 at zero degrees tilt. This allows the operator to easily switch between multiple tilt angles by pivoting the calibration plate 14 until the appropriate stop pin 51 or 53 is magnetically engaged. Other applications may use different angles provided by different lengths or locations of the stop pins 51, 53.

FIG. 8 shows the details of the spindle 38 and the back of the calibration plate 14. The circumference of the spindle 38 has a length of steel wire 44 wrapped at least one turn around it along grooved wire guides 60. The opposite end of the wire 44 is clamped in the upper grip 102 so that when the load frame crosshead is moved, the steel wire 44 is pulled and spindle 38 rotates. This is a simple method of providing the option of controlled automatic rotation of the spindle 38 and calibration plate 14.

FIG. 9 is a schematic of an installed apparatus of an embodiment of the present disclosure, with the wedge calibration tool 30 configured and clamped with the top grip 102.

Some embodiments may include a second pattern of calibrated images on the back or reverse side of the calibration plate 14. For example, black dots on a white background. The design of the calibration tool 30 allows for the calibration plate 14 to be easily removed from the spindle 34 and flipped over or reversed so that a single calibration plate 14 may provide two different sets of calibration images. This may be useful, for example, to change scale or type of features for calibration of different three-dimensional system cameras.

Typical advantages of the disclosed calibration tool and method may include:

1. Eliminates the need for operator to manually move a hand-held calibration plate about the three-dimensional image volume to be calibrated.

2. Provides repeatable sampling of the three-dimensional image volume for every calibration run.
   2.a. More controlled sampling of the volume than by hand-held plate methods.
   2.b. Maintains optimal filling of camera field of view for each position/orientation—no images with large empty portions due to uncontrolled skew of a hand-held plate.
   2.c. Provides more complete sampling of the full three-dimensional test volume.

3. Ease of use.
   3.a. Easy to install and remove.
   3.b. Minimal operator training.
   3.c. Operator does not have to be involved with choosing calibration plate positions.
   3.d. Operator does not have to judge the quality of camera images, or reject any images.

4. Improved calibration accuracy and repeatability.
   4.a. Operator variability is not a factor in calibration results.
   4.b. More uniform and repeatable sampling of the three-dimensional image volume.

5. Capable of reducing the number of unknown parameters in the calibration process.
   5.a. Known calibration plate tilt angle(s).
   5.b. Known calibration plate rotation angles.

6. Capable of providing automatic calibration plate rotation without additional motors or complexity.

7. Method is scalable upwards or downwards to calibration plate sizes that are impractical for hand-held methods.

Thus the several aforementioned objects and advantages are most effectively attained. Although preferred embodiments of the invention have been disclosed and described in detail herein, it should be understood that this invention is in no sense limited thereby.

What is claimed is:

1. A device for providing visual calibration images in a test space of a tensile test load frame including at least one grip in a test space for imparting a load within a test space, including:
   a calibration test pattern;
   a mount engaging the calibration test pattern, the mount including a pivot wherein a tilt angle the calibration test pattern can be pivoted along a pivot axis;
   a spindle rotationally mounted on a device frame and rotating about a rotational axis, the spindle engaging the mount; and
   the device frame including a mounting tab for engagement by a grip within test space of the tensile test load frame, thereby positioning the calibration test pattern within test space of a tensile test load frame.

2. The device of claim 1 wherein the spindle rotates to detent positions about the rotational axis.

3. The device of claim 2 further including at least a first stop for fixing a tilt angle of the calibration test pattern at a first tilt angle.

4. The device of claim 3 further including a second stop for fixing a tilt angle of the calibration test pattern at a second tilt angle.

5. The device of claim 4 wherein the pivot axis is perpendicular to the rotational axis.

6. The device of claim 4 wherein the calibration test pattern is planar.

7. The device of claim 6 wherein the calibration test pattern includes a visual dot array or checkerboard pattern.

8. The device of claim 4 wherein the first and second stops include respective first and second magnets for magnetically engaging the calibration test pattern.

9. A method of providing calibration data sets defining a common three-dimensional measurement volume in object space for a tensile test load frame including at least one grip in an object space for imparting a load within an object space, including the steps of:
   providing a calibration test pattern within object space in a tensile test load frame;
   providing a mount engaging the calibration test pattern, the mount including a pivot wherein a tilt angle the calibration test pattern can be pivoted along a pivot axis; and a spindle rotationally mounted on a device frame and rotating about a rotational axis to rotational angles, the spindle engaging the mount, the device frame including a mounting tab for engagement by a grip within object space of the tensile test load frame, thereby positioning the calibration test pattern within object space of a tensile test load frame;
   providing at least one image capture device to record images of the calibration test pattern;
   positioning the calibration test pattern through a series of tilt angles and rotational angles; and
   during the step of positioning the calibration test pattern, performing the step of operating the at least one image capture device to record images of the calibration test pattern.

10. The method of claim 9 wherein the step of providing at least one image capture device includes providing at least two image capture devices.

11. The method of claim 9 further including the step of providing the spindle with a plurality of detent rotational positions.

12. The method of claim 11 further including the step of providing at least a first stop for fixing a tilt angle of the calibration test pattern at a first tilt angle.

13. The method of claim 12 further including the step of providing a second stop for fixing a tilt angle of the calibration test pattern at a second tilt angle.

14. The method of claim 13 wherein the step of providing the first and second stops includes the step of providing respective first and second magnets for magnetically engaging the calibration test pattern.

15. The method of claim 13 wherein the step of providing a calibration test pattern includes providing a planar calibration test pattern.

16. The method of claim 15 wherein the step of providing a calibration test pattern includes providing a planar calibration test pattern including a visual dot array or checkerboard pattern.

* * * * *